United States Patent [19]

Wiseheart et al.

[11] 4,411,485

[45] Oct. 25, 1983

[54] WALL PLATE KIT FOR TELEPHONES

[75] Inventors: Ronald W. Wiseheart, Hector; Daniel Meyer, Rochester, both of Minn.

[73] Assignee: Communications Systems, Inc., Hector, Minn.

[21] Appl. No.: 286,524

[22] Filed: Jul. 24, 1981

[51] Int. Cl.³ ............................................. H02B 1/02
[52] U.S. Cl. ................................. 339/125 R; 179/178
[58] Field of Search ........................... 339/123, 125 R; 248/243; 411/371, 373, 378, 508; 220/242; 179/1 PC

[56] References Cited

PUBLICATIONS

Advertisement, "Telephony", Jan. 3, 1977, p. 27, GTE Automatic Electric.

*Primary Examiner*—Eugene F. Desmond
*Attorney, Agent, or Firm*—Kinney, Lange, Braddock, Westman and Fairbairn

[57] ABSTRACT

A wall plate is used for both a receptacle for a remote conventional telephone and for mounting a wall telephone by either detaching or attaching a pair of mounting posts. The wall plate is fastened to a support, such as a wall, and has a communication receptacle or jack located therein. A pair of plugs cover a pair of spaced-apart apertures in the wall plate when the wall plate is used with remote conventional telephones. To mount a wall telephone on the wall plate, the plugs are removed and detachable mounting posts are placed through the apertures and secured to a backing frame. The wall phone is mounted on the mounting posts and connected to the jack.

7 Claims, 7 Drawing Figures

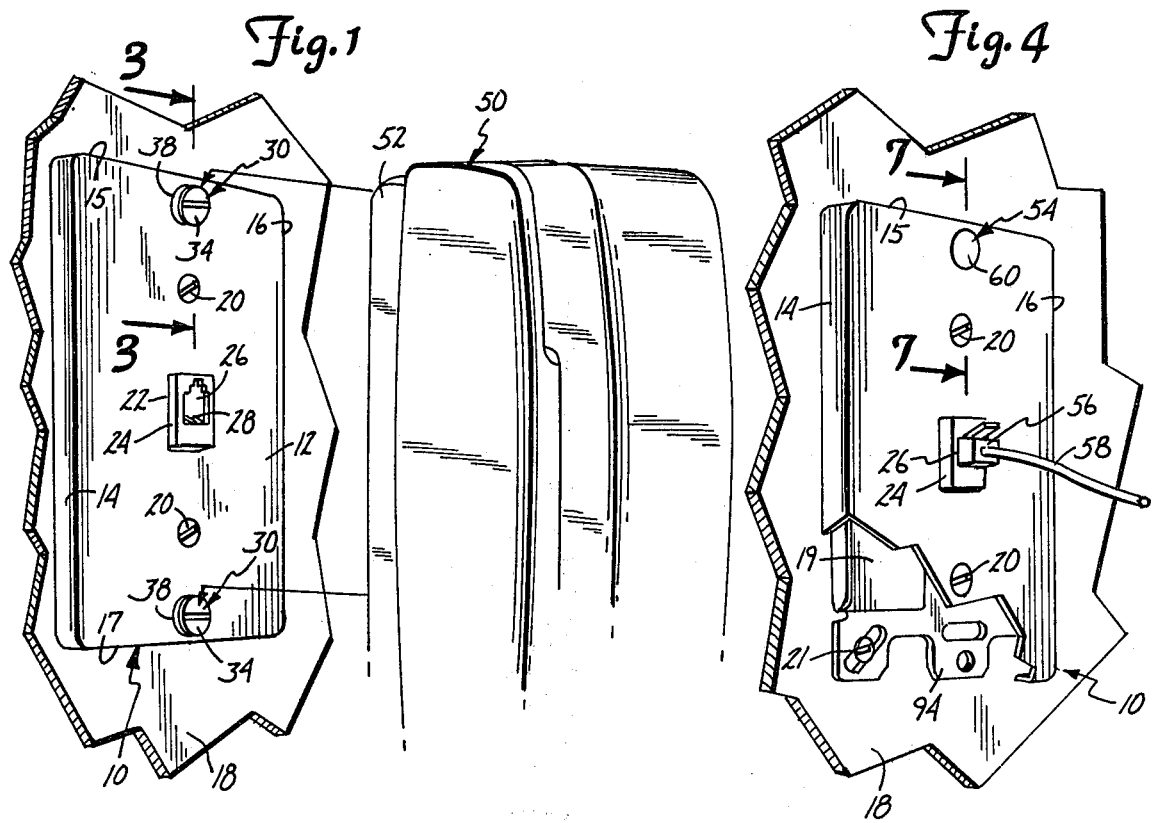
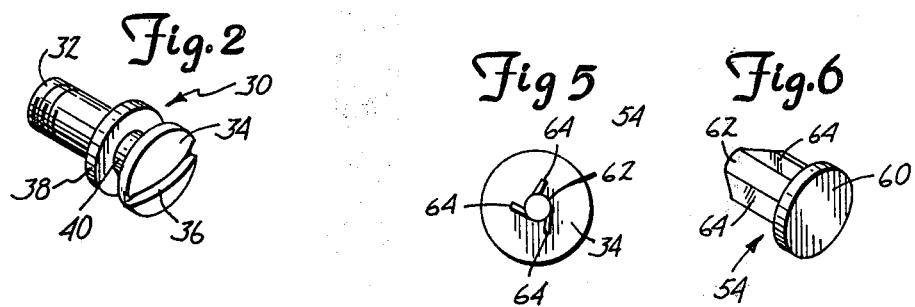
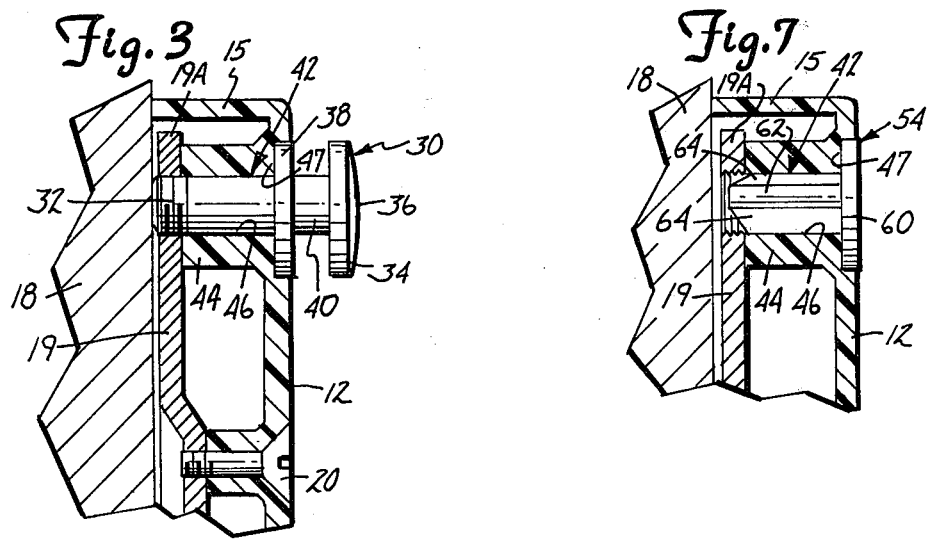

WALL PLATE KIT FOR TELEPHONES

BACKGROUND OF THE INVENTION

1. Field of the Invention

The present invention relates to wall plates that have receptacles for plug in telephones.

2. Description of the Prior Art

In the prior art, there are typically two types of wall plates that are used to cover the wires that connect a communication receptacle for a telephone to a communication system.

The first type of wall plate is used with conventional table top telephones. The table top telephone is remote and is connected by a cord having a plug inserted into the communication receptacle.

The second type of wall plate is a mounting plate that is used for wall telephones. The mounting plate typically includes a pair of vertically spaced headed posts which engage slots on the back end of the wall phone. When the wall phone is being mounted, a plug in the back of the phone is inserted into the communication receptacle to connect the wall telephone to the communication system.

The wall telephone mounting plate can also be used to connect table top telephones by merely inserting the plug of the table top telephone into the communication receptacle. However, in the conventional plates the mounting posts are an integral part of the mounting plate and cannot be removed. The mounting posts are unsightly and are undesirable when only a conventional table top telephone is to be used. Generally, when a wall mounted telephone is removed and a table top telephone is exchanged therefor, the mounting plate is discarded and a wall plate without mounting posts is substituted. Alternatively, when a wall mounted telephone is desired in place of a table top telephone, the wall plate with mounting posts is substituted for the wall plate without mounting posts.

SUMMARY OF THE INVENTION

The present invention includes a wall plate kit for use with a communication receptacle that connects either conventional table top telephones or wall mounted telephones to a communication system. The wall plate is mounted on a frame and has a plurality of mounting posts attached to the frame and extending through the wall plate. When the mounting posts are detached, a plurality of plugs are attached to the wall plate to cover the apertures from view.

The wall plate is converted for mountable use with a wall telephone by removing the plugs and attaching the mounting posts. The wall phone is then attached to the mounting posts and is connected to the communication receptacle.

BRIEF DESCRIPTION OF THE DRAWINGS

FIG. 1 is a perspective view of the wall plate of the present invention with mounting posts;

FIG. 2 is a perspective view of a detachable mounting post of the present invention;

FIG. 3 is a fragmentary cross sectional view taken along the line 3—3 in FIG. 1;

FIG. 4 is a perspective view of the wall plate of the present invention with the optional plugs covering the openings for the mounting posts;

FIG. 5 is an end view of the plug used as a part of the present invention;

FIG. 6 is a perspective view of the plug of the present invention; and

FIG. 7 is a fragmentary cross sectional view taken along the line 7—7 in FIG. 4.

DETAILED DESCRIPTION OF THE PREFERRED EMBODIMENT

The mounting plate of the present invention is generally indicated at 10 in FIG. 1. Throughout the figures, like reference characters are used to indicate like elements. The mounting plate 10 has a front wall surface 12 and integral side walls 14, 15, 16 and 17 that abut against a supporting wall 18. The mounting plate is typically fastened with screws 20 to a frame of mounting block 19 that is independently mounted on a support wall 18, as with screws 21 (see FIG. 4). The frame 19 has a number of slots for the mounting screws which attach the frame to a wall or electrical box if desired.

The support frame 19 is modified from a conventional support frame by including ears 19A at its upper and lower ends. The ears 19A have threaded openings which are used to anchor wall telephone support posts as will be explained.

The plate 10 has an aperture 22 in a central location through which a modular communication jack 24 extends. The jack 24 is conventional, similar to that described in the Hughes U.S. Pat. No. 4,221,458, having a plug receiving aperture 26 and spring type conductive contacts 28. The jack 24 is preferably supported by the support frame or mounting block 19. The support frame 19 carries a terminal block for connection of the jack to the telephone lines.

A pair of telephone mounting shoulder posts 30 are detachably mounted to the frame 19. Preferably, there are two mounting posts 30 spaced apart vertically from each other on opposite sides of the modular jack 24. As shown in more detail in FIG. 2, the mounting posts 30 each have threaded ends 32 proximate one end and a head 34, with a screwdriver slot 36, at the other end. A collar 38 is positioned between the threads 32 and the head 34 and forms a shoulder that tightens down onto the plate. The post shank 40 between collar 38 and the head 34 forms the support for the wall telephone.

The mounting posts 30 are inserted through openings 42 so that the collar 38 partially fits within a depression 47 in the front wall surface 12, as shown in FIG. 3, and engages the end surface of the depression 47. The openings 42 are defined in tubular members 44 which are integral with the plate 10 and which have inner cylindrical surfaces 46. The threaded ends of the mounting posts 30 are threaded into the provided openings in the ears 19A of the support frame 19.

Referring back to FIG. 1, a conventional wall phone 50 is to be mounted to the mounting plate 10 and has a back section 52 that abuts against the front wall surface 12. The back section 52 contains a conventional modular communication plug (not shown) that connects the wall telephone 50 with the contacts in the jack 24. In addition, keyhole slots (not shown) on the back surface of the back section 52 cooperate with the mounting posts 30 and engage the shanks 40 of each post to secure the wall telephone in a hanging position. The plug on the wall phone will slide or move sufficiently when it is plugged into the jack 24 to permit the keyhole slots of the phone 50 to be slipped over the shanks 40 of the shoulder posts 30.

The wall plate of the present invention is also usable with a conventional table top telephone. The mounting posts 30 are removed and cover plugs 54 are then inserted into the passages 42 in place of the posts 30, as illustrated in FIGS. 4 and 7. The plugs 54 cover the passages 42 and convert the wall plate 10 into an attractive wall plate that is typically used in cooperation with a table top telephone connected to the jack 24 by a plug 56 on the end of an extension cord 58.

A preferred embodiment of the plug 54 is shown in greater detail in FIGS. 5 and 6. The plug 54 has a button top 60, and a central post 62 with a plurality of radially extending vanes 64. The button top 60 has a diameter substantially equal to the collars 38 of the mounting post 30 and consequently, the button top 60 fits into the respective depression 47 and covers that passages 42 from view. The button top 60 is substantially flush with the top surface 12 of the wall plate. The resilient vanes 64 preferably are plastic and frictionally engage the inner surface 46 of the passage 42 retaining the plug 54 in place.

Preferably, the present invention is in the form of a kit. The wall plate 10, as illustrated in FIGS. 1 and 4, along with the mounting frame 19 (which includes the jack 24 and terminal blocks), plugs 54 and the mounting posts 30 comprise the kit. Preferably, the screws for fastening the frame 19 to the wall and wall plate to the frame are included along with wires needed to connect the jack to a communications line. In using the kit, the frame 19 is mounted in place and the jack 24 is connected to the telephone line. Once the plate 10 is positioned with screws 20, either the detachable posts 30 or the plugs 54 can be mounted, depending on what type of telephone is to be used with the present invention.

The wall plate of the present invention is a uniquely versatile wall plate. When a conventional table top telephone is connected to the jack 24, the mounting posts 30 are removed and the plugs 50 are used to cover the apertures to provide a pleasing appearance. With the plugs 54 in place and the apertures hidden from view, the wall plate is similar in appearance to other wall plates used solely with conventional table top telephones.

When a wall phone is desired, the plugs 54 are removed from connection with the apertures and the mounting posts are inserted through the apertures 42 and threaded into the ears 19A of the frame 19. A wall phone may then be hung on the mounting posts and conductively connected to the jack 24 without the need for obtaining a special wall plate to hang the wall phone.

CONCLUSION

The wall plate 10 of the present invention is used both for connecting wall telephones and table top telephones to communication lines. The removable mounting posts permit the use of the same wall plate whether a wall telephone or a table top telephone is used. When the user desires to replace a conventional table top telephone with a wall telephone, the wall plate need not be changed. The plugs 54 are simply removed and the detachable mounting posts 30 are inserted in their place. In addition, if the user desires to replace a wall telephone with a conventional table top telephone, the unsightly mounting posts can be removed. The plugs are then inserted in place of the mounting posts.

The ears 19A of frame 19 provides a very stable support for the posts 30. The sleeves 44 permit the posts 30 to tighten the wall plate against the frame 19 very securely to carry the loads of mounting and removing a phone from the posts. The conventional plates have riveted telephone support posts which loosen after limited use. Also, the plate of the present invention does not have to be changed for use with a table or desk phone. The posts 30 merely have to be removed and the cover plugs inserted.

Although the present invention has been described with reference to preferred embodiments, workers skilled in the art will recognize that changes may be made in form and detail without departing from the spirit and scope of the invention.

What is claimed is:

1. A wall plate for use with a communciation receptacle and a telephone, the wall plate comprising:
   a front wall having an aperture for positioning and presenting a communication jack for conductive connection with the telephone;
   post means for hanging the telephone proximate the front wall, said post means including shoulder posts, each post having a shoulder which engages a front surface of the plate, said plate having a sleeve through which the posts pass to permit the posts to be tightened as the sleeve is forced against a mounting frame;
   means for detachably receiving and retaining the post means for hanging the telephone, said front wall having apertures through which the post means pass, and said means for detachably receiving and retaining the post means comprising said mounting frame having a threaded opening aligned with each aperture for threadably receiving the post means; and
   cover plug means for selectively inserting into and covering from view the apertures when the post means are removed from the apertures, said plug means including a pair of plugs, each plug having a top with a coaxial shaft extending therefrom having radially extending resilient vanes for frictional engagement with an interior of the sleeve, the plate having a depression around the apertures so the tops of the plugs are substantially flush with the top surface of the wall plate when inserted into the aperture.

2. The wall plate of claim 1 wherein the post means for hanging a telephone comprises a pair of spaced apart shouldered mounting posts spaced vertically apart on opposite sides of the communication jack.

3. A wall plate kit for use with wall telephones and other types of telephones, the kit comprising:
   a wall plate having a front wall with an outer surface and locating means for connecting telephones to a communication line, and a pair of apertures therethrough;
   a support frame adapted to be supported relative to a wall, the support frame having a pair of threaded apertures alignable with the apertures of the wall plate;
   a pair of detachable mounting posts for supporting a telephone, each post having a threaded end, which posts pass through the apertures of the wall plate and are removably mountable on the support frame by threadably engaging the threaded apertures with the threaded ends, the posts having shoulders which bear on the wall plate as the posts are threaded to the frame, and means on the wall plate to bear against the frame when the posts are threaded tightly to the support frame;

a pair of plugs that fit into the apertures and have heads to cover the apertures when the mounting posts are removed and the wall plate is used with a telephone located remote from the wall plate, each plug of the pair of plugs having a top with a shaft extending therefrom, the shaft having radially extending resilient vanes for frictional engagement with surfaces defining the second apertures, the outer surface of the wall plate being recessed to receive the tops of the plugs so that the tops of the plugs are substantially flush with the outer surface of the wall plate when the plugs are inserted in the apertures;

screw means for fastening the wall plate to the frame independently of the posts; and a communication jack extending through a central aperture in the wall plate.

4. The kit of claim 3 wherein said posts are shoulder posts having shoulder surfaces which bear against the wall plate and a headed shank protruding from the outer surface of the wall plate for receiving and supporting a telephone.

5. A wall plate kit for use with wall telephones and other types of telephones, the kit comprising:

a support frame adapted to be supported relative to a wall having a first pair of threaded apertures;

a wall plate having a front wall and locating means for connecting telephones to a communication line, and a pair of second mounting apertures for use in mounting the wall plate, and a pair of third apertures alignable with the first pair of apertures;

a pair of detachable mounting posts for supporting a telephone, each post having a threaded end, which posts pass through the first and third apertures and whose ends are threadably attachable with the first pair of apertures; and a pair of plugs that fit into the apertures and have heads to cover the third apertures when the mounting posts are removed and the wall plate is used with a telephone located remote from the wall plate so that the first and third apertures are hidden from view.

6. The kit of claim 5 and further comprising screw means for fastening the wall plate to the frame independently of the posts, said screw means passing through the second apertures.

7. The kit of claim 5 and further comprising a communication jack extending through a central aperture in the wall plate.

* * * * *